Jan. 24, 1967  R. J. WEISHAAR  3,300,683
WELDING APPARATUS

Filed Jan. 6, 1964  2 Sheets-Sheet 1

INVENTOR.
ROBERT J. WEISHAAR
BY Reynolds & Christensen
ATTORNEYS

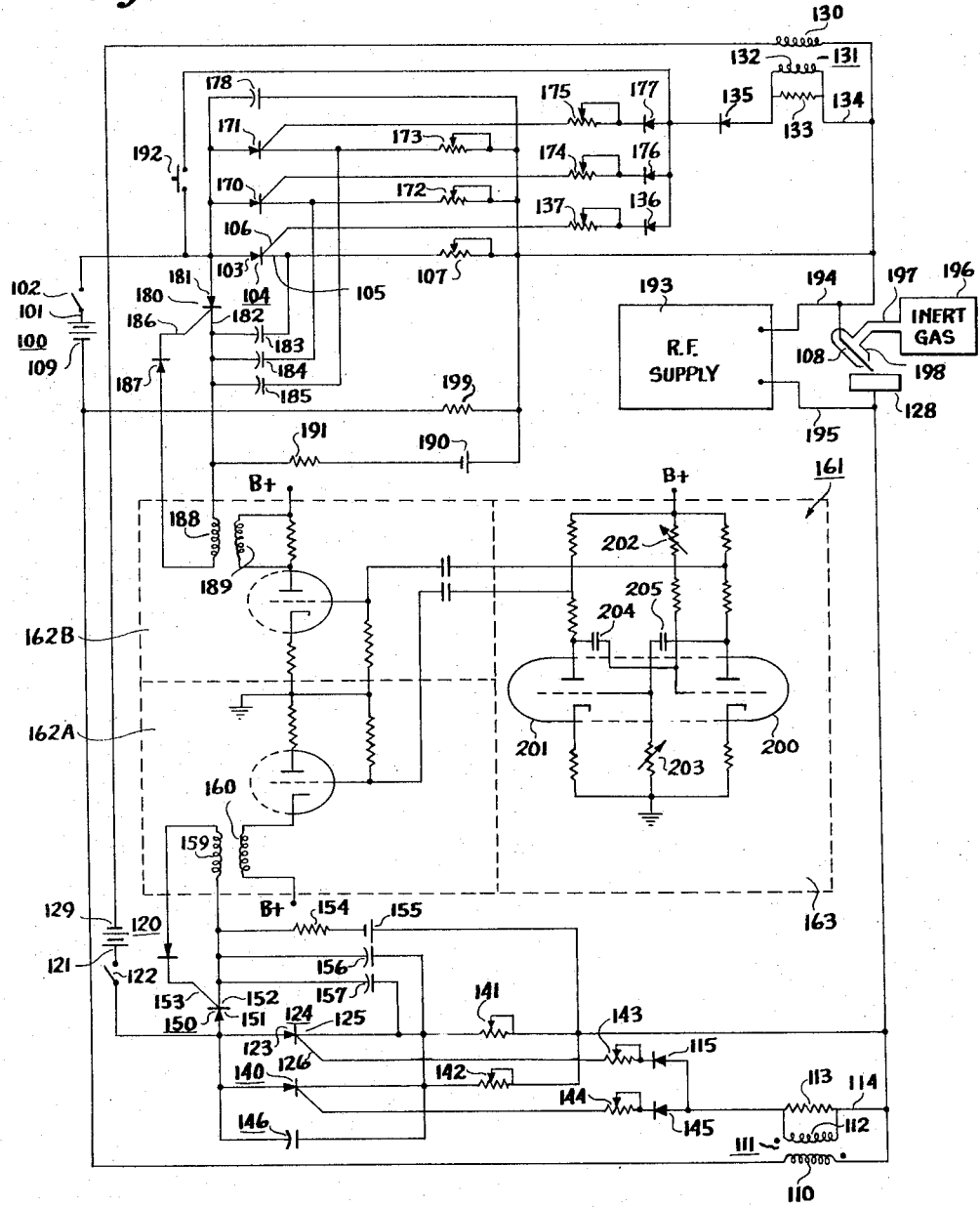

United States Patent Office 3,300,683
Patented Jan. 24, 1967

3,300,683
WELDING APPARATUS
Robert J. Weishaar, Mount Lake Terrace, Wash., assignor to The Boeing Company, Seattle, Wash., a corporation of Delaware
Filed Jan. 6, 1964, Ser. No. 335,715
4 Claims. (Cl. 315—205)

The present invention relates to welding apparatus and more particularly to an improved apparatus which combines the advantages of A.C. and D.C. welding systems while eliminating many of the disadvantages of each of the two types of systems.

It is well known in the welding art that either A.C. or D.C. current can be used for providing the required electric current between a suitable electrode or welding rod and a workpiece. Each of the two types of systems has advantages and disadvantages. For example, in the A.C. systems cleaning of the surfaces and destruction of oxide films automatically takes place due to the current reversals, thus leading to a uniform weld. However the current reversals cause relatively long periods of time during which the current is at a very low value and during such periods of low current the pool of molten metal tends to solidify. Also reversals in the current flow in an A.C. are welder will tend to cause the arc to flutter when dirt or oxide films are present. D.C. welders have the advantage that a steady high current can be applied to the welding rod and workpiece and hence cooling of the molten metal is avoided. A more uniform and stronger weld therefore results, and also the high energy required for fusion welding of high strength aluminum and other alloys can be readily provided. A disadvantage of D.C. welding apparatus, however, is that since there is no reversal of current flow the cleaning action associated with A.C. welders does not take place and hence oxide films tend to form. In addition, when a D.C. arc is used on magnetic materials the arc tends to be deflected or wander as a result of magnetic fields which build up during the continued application of current in a single direction.

Accordingly, it is an object of the present invention to provide an improved arc welding apparatus which makes use of the advantages of both A.C. and D.C. welding techniques.

A further object of the present invention is to provide an improved welding apparatus wherein a relatively uniform heat is maintained by direct current and wherein means is provided for periodically applying a reverse current pulse to cause cleaning of the surfaces being welded.

Another object of the present invention is to provide an improved arc welding apparatus wherein direct current is utilized for providing a high energy arc and wherein a rapid reversal of the direction of current flow takes place for a selected time interval in a manner such that cooling of the molten metal does not occur and a desirable cleaning action is obtained.

An additional object of the present invention is to provide a welding apparatus which uses current flow in two opposite directions with the time required for reversal of flow being extremely short and wherein the relative duration of current flow in the two directions is adjustable.

Another object of the present invention is to provide an improved welding apparatus wherein current flow in either of two directions can be provided with the time required for the change in maximum current flow in one direction to maximum current flow in the opposite direction is extremely short and wherein the duration of current flow in each direction is readily controlled.

These objects are achieved in accordance with the teachings of the present invention by making use of regulated direct current supply means and a pair of current control circuits which are each under the control of a master timing and control device. The current control circuits are respectively connected in opposite polarity to a welding rod or electrode and to a workpiece so that when one of the current control circuits is active current will flow from the welding rod to the workpiece. Subsequent operation of the second current control circiut then cases current to flow in the reverse direction from the workpiece to the welding rod and hence cause a cleaning action to occur. The master timing and control device serves to control the two current control circuits in a manner such that one or the other of the two is made conductive for a selected length of time. In one embodiment a suitable feedback network interconnects the two current control circuits such that when one of the current control circuits is rendered nonconductive by the control device the other current control circuit is immediately rendered conductive. By using fast acting current gating devices the time required for complete current reversal is made extremely short and hence there is not enough time during the reversal for cooling of the molten metal. The duration of current flow in each direction is readily controlled so that current flow can be made predominant in one direction and only a short pulse provided in the opposite direction to provide the desired deep heating action and yet obtain a cleaning action. The spacing and duration of the cleaning pulses is variable since the relative duration of current flow in each direction is adjustable.

As is common in the art, a source of radio frequency energy is continuously applied between the workpiece and the welding rod so that the gap is continuously ionized and hence during the extremely short time required for a current reversal there is assurance that the arc will not be extinguished. The circuit may be so arranged that either a single regulated source of direct current or a pair of regulated D.C. power supplies can be used to provide the necessary high current for the welding to take place. Using current switching devices currently available it is found that the time required for complete reversal of direction of current flow in the welding apparatus can be as low as a few microseconds and thus the advantages of a D.C. system as well as those of an A.C. system are simultaneously obtained.

The above and additional objects and advantages of the present invention will be more clearly understood from the following description when read with reference to the accompanying drawings wherein, FIGURE 1 is a block diagram illustrating the manner of connecting various components for achieving the advantages of the present invention;

FIGURE 2 is an additional block diagram illustrating a modification of the system shown in FIGURE 1 and wherein a single source of regulated direct current provides the necessary energy for the welding apparatus and where feedback networks are used for turning the current control circuits on;

FIGURE 4 is a schematic circuit diagram illustrating one specific arrangement of individual components connected in circuit arrangement for carrying out the teachings of the present invention.

Figure 1:
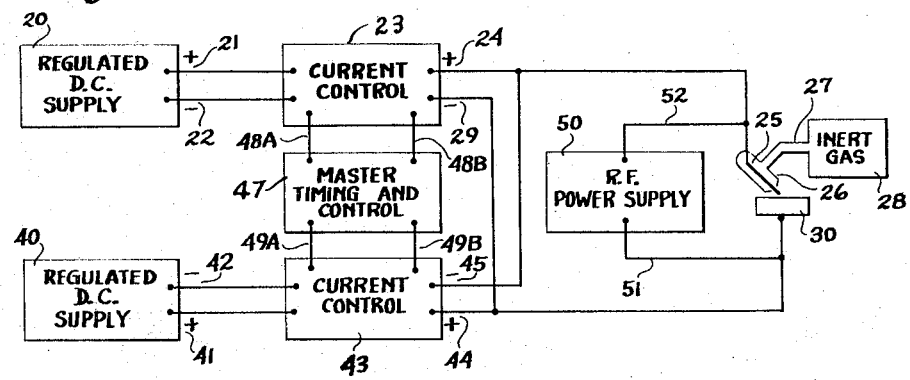

Referring now to the drawings and in particular to FIGURE 1 it will be seen that a first regulated D.C. power supply 20 having a positive terminal 21 and a negative terminal 22 is connected by appropriate leads to a first current control device 23 described with more particularity hereinafter. A positive voltage is provided on lead 24 from the current control device 23 to a suitable welding rod or electrode 25 disposed within an envelope 26 coupled by appropriate piping 27 to a source 28 of inert gas as is common in the art. A negative lead 29 connected to the first control device 23 and to a suitable workpiece 30 completes the necessary circuit for the striking and maintenance of an arc between the rod 25 and the workpiece 30.

In a similar manner a second regulated direct current supply 40 has a positive terminal 41 connected to a second current control device 43 as well as a negative terminal 42 connected to the current control device 43. A lead 44 serves to connect positive voltage from the current control device 43 to the workpiece 30 while a lead 45 serves to provide negative voltage from the current control device 43 to the welding rod 25.

A master timing and control device or circuit 47 will be seen to have a first signal output circuit including leads 48A and 48B connected to the first current control device 23 and a second signal output circuit including leads 49A and 49B connected to the second current control device 43. The master timing and control device 47 is so constructed and coupled with the current control devices 23 and 43 that it serves to control the duration of the conduction of each of the two devices 23 and 43 and operates in a manner such that one or the other of the two devices 23 or 43 is conductive when the welding apparatus is being used. The device 47 may be any of a number known in the art and so constructed that the device 23 is turned on and simultaneously the device 43 is turned off. After a selectable time interval the device 43 is turned on and the device 23 is turned off. The time duration of conduction of either of the two current control devices is thus controllable so that a relatively short duration pulse of current is supplied in one direction and a long duration pulse of current applied in the opposite direction. A conventional free running multivibrator having two timing networks each including a variable resistance can be used alone or in combination with a bistable circuit as part of the control device 47. Various other circuit arrangements known in the art can be used to maintain the current control devices 23 and 43 in opposite states of conduction for selected times and to then cause a reversal of their conditions.

An R.F. power supply 50 is connected by leads 51 and 52 to the welding rod 25 and to the workpiece 30 so that during the time of reversal of the direction of current flow between the rod and the workpiece the surrounding medium will be ionized and hence the arc will not be extinguished.

The operation of the apparatus of FIGURE 1 is as follows: Welding current is provided by the first regulated supply 21 through the current control device 23 to the electrode 25 and workpiece 30 with conventional current flow occurring from the electrode 25 to the workpiece 30. This direction of current flow is that which is normally used when welding materials such as aluminum and wherein an electrode such as tungsten surrounded by an inert gas such as helium or argon is utilized. After the welding current has been provided from the electrode 25 to the workpiece 30 for a predetermined length of time, the master timing and control device 47 serves to apply a terminating pulse to the current control device 23 to render said device nonconductive and to simultaneously apply a pulse to the second current control device 43 to render it conductive to cause current to be provided from the second regulated power supply 40 to the workpiece 30 and welding rod 25. It should be noted that when the second current control device 43 is made conductive the direction of current flow between the electrode 25 and workpiece 30 will be reversed in that the workpiece 30 is now the positive terminal for the arc. This reverse pulse of current is maintained for a selected length of time (normally substantially shorter than the duration of the application of the current from source 20) at which time a second set of signals from the master timing and control network is applied to the second current control device 43 rendering it nonconductive and to the device 23 to render the first current control device 23 conductive. The circuit therefore returns to its initial condition set forth above wherein the first regulated D.C. supply 20 is providing the necessary welding current to the electrode 25 and workpiece 30. A convenient arrangement for the application of the control signals is that wherein signals on 48A or 49A render the associated device 23 or 43 conductive, signals on leads 48B or 49B render the associated device 23 or 43 nonconductive, and wherein the control device 47 alternately applies signals to the pair of leads 48A and 49B and then to 48B and 49A.

Figure 2:
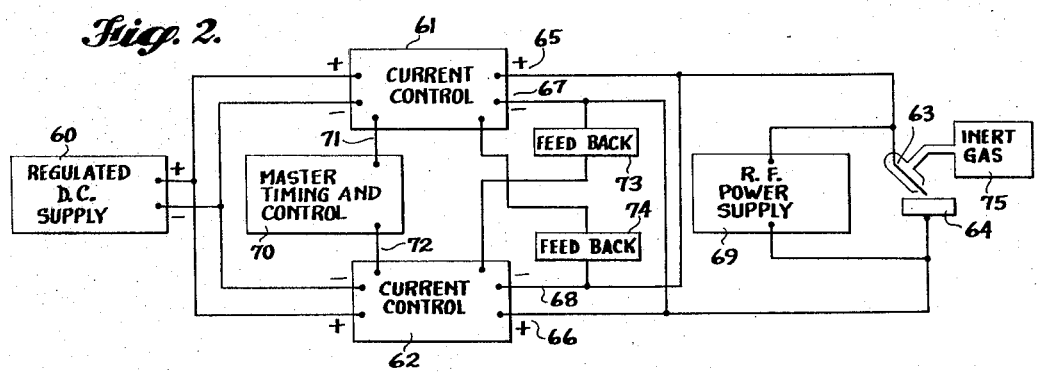

In the embodiment of the invention illustrated in FIGURE 2 a single regulated power supply 60 is connected through the first and second current control devices 61 and 62 to the welding rod 63 and the workpiece 64 in a manner such that the direction of current flow between the electrode 63 and workpiece 64 is in opposite directions depending upon which of the two current control devices 61 or 62 is conducting. That is, it will be seen that the positive output terminal 65 of the first current control device 61 is connected to the electrode 63 while the positive electrode 66 of the second current device 62 is connected to the workpiece 64. The negative electrode 67 of the first current control device 61 is connected to the workpiece 64 while the negative terminal 68 of the second current control device 62 is connected to the electrode 63. A source of radio frequency energy is provided by the power supply 69 across the gap between the electrode 63 and workpiece 64 to sustain the arc during the time of current reversals.

As in FIGURE 1, a master timing and control device 70 is connected by signal circuits 71 and 72 to the current control devices 61 and 62 while a pair of feedback circuits 73 and 74 are respectively connected between the leads 67 and the second current control device 62 and the lead 68 and the first current control device 61. An inert gas supply 75 is provided to shield the arc.

The operation of the embodiment of the invention illustrated in FIGURE 2 is similar to that of of FIGURE 1 in that after current has been provided to the welding rod 63 and workpiece 64 through one or the other of the current control devices 61 or 62 for a selected length of time an output pulse is generated by master timing and control device 70 to cause the then active one of the current control devices to be rendered nonconductive. Such nonconduction of the previously active current control device serves by means of one or the other of the feedback circuits 73 or 74 to render the other of the two current control devices active and hence cause a reversal of current flow across the arc between the welding rod 63 and the workpiece 64.

By utilizing the embodiments of the invention illustrated in FIGURE 1 and FIGURE 2 it is found that direct current can be applied to the welding circuit in a manner such that a deep heating action takes place. The duration of the flow of current in one direction is controlled by the master timing and control device and therefore the advantages of a D.C. welder as well as those of an A.C. welder are obtained and in addition the duration of current flow in each direction can be controlled so that current flow in a desired direction can be made predominant.

Figure 3:
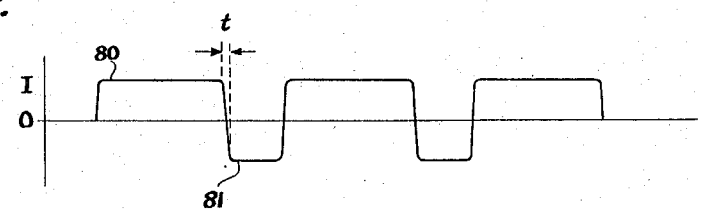
FIGURE 3 is a diagram of the current waveform which can be obtained by the welding apparatus of FIGURES 1 and 2.

Referring to FIGURE 3 it will be seen that substantially rectangular current waveforms are obtained since D.C. supplies are used and the only time required for a reversal in the direction of current flow is that for turning one of the current control devices off and turning the other of the two current control devices on. Current control devices readily available at the present time are capable of being rendered conductive or nonconductive in a period of time corresponding to a few microseconds or as illustrated in FIGURE 3 by the time interval $t$. Thus it will be seen that the time for reversal of direction of current flow is very short in the apparatus of the present invention by comparison to A.C. welders wherein a relatively long period of time is required for the current to change from a maximum in one direction to a maximum in the other direction. In addition, as seen in FIGURE 3 the current which is provided by current flowing through one of the current control devices can be made relatively long by comparison to the duration of the current provided by current flowing through the second current control device. Thus the advantages of both A.C. and D.C. systems are obtained since a short duration cleaning pulse is selectively applied between the workpiece and the welding rod. The high D.C. component of welding current leads to high energy capabilities and therefore fusion welding of metals such as aluminum as well as of alloys having high melting points is really accomplished.

While various circuits can be used to provide the individual components illustrated in the block diagram of FIGURES 1 and 2, there is shown in FIGURE 4 one specific circuit diagram which has been found to work well in accordance with the teachings of the present invention. Referring now to FIGURE 4 it will be seen that a first regulated D.C. supply illustrated schematically as a battery 100 has its positive terminal 101 connected through a first switch 102 to the anode 103 of a first current gating device illustrated as a silicon controlled rectifier 104 having its cathode 105 connected through a variable resistor 107 to a welding electrode or rod 108. A negative terminal 109 of the battery 100 is connected through a first winding 110 of a transformer 111 to any suitable workpiece 128. It will be seen that when the switch 102 is closed and the silicon controlled rectifier 104 is conductive that current will flow from the battery 100 to the welding electrode or rod 108, to the workpiece 128 and through the transformer winding 110 back to the battery 100.

In a similar manner a second battery 120 has its positive terminal 121 connected through a switch 122 to the anode 123 of a silicon controlled rectifier 124 having its cathode 125 connected through a variable resistor 141 to the workpiece 128. The negative terminal 129 of the battery 120 is connected through a first winding 130 of a second transformer 131 to the welding rod 108. Thus it will be seen that when the switch 122 is closed and the current gating device 124 is conductive the battery 120 will provide current flow between the workpiece 128 and the welding rod 108 in a direction opposite to the direction of current flow when the battery 100 is providing the current.

The transformer winding 112 will be seen to have a resistor 113 connected thereacross with a lead 114 serving to connect one side of the transformer winding 112 to the workpiece 128. The other side of the winding 112 is connected through a diode 115 and through a variable resistor 143 to the gate electrode 126 of the silicon controlled rectifier 124. The relationship of the windings 110 and 112 of the transformer 111 is such that when current flow through the winding 110 is terminated a positive pulse will be applied through the diode 115 to the gate or control electrode 126 of the silicon controlled rectifier 124 to thereby render that device conductive and cause current to be provided by the battery 120 to the work load including the workpiece 128 and welding rod 108.

In a similar manner the transformer 131 has a second winding 132 with the resistor 133 connected thereacross and connected by a lead 134 to the welding rod 108. Positive pulses induced in the winding 132 by termination of current flow through the winding 130 are applied through diodes 135 and 136 and a resistor 137 to the gate or control electrode 106 of the silicon controlled rectifier 104. The arrangement is such that when current flow through the winding 130 terminates a positive pulse is applied to the silicon controlled rectifier 104 to render that device conductive and cause current to be provided to the welding rod 108 and workpiece 128 by the battery 100. To increase the current carrying capability of the circuit and yet to utilize low cost components it will be seen that a silicon controlled rectifier 140 is connected in parallel with the silicon controlled rectifier 124 by having its anode connected directly to the anode 123 and its cathode connected through a variable resistor 142 to the workpiece 128. The control electrode of the silicon controlled rectifier 140 will be seen to be connected through a variable resistor 144 and a diode 145 to the winding 112 of the transformer 111. The variable resistors 141, 142, 143 and 144 are so adjusted that the two silicon controlled rectifiers 124 and 140 will be simultaneously rendered conductive by the pulse generated in the winding 112 and also the current carried by the two silicon controlled rectifiers will be substantially equal. A filter capacitor 146 will be seen to be directly connected across the two silicon controlled rectifiers 124 and 140.

The circuit which is used to terminate conduction of the silicon controlled rectifiers 124 and 140 will be seen to include a current gating device shown as a silicon controlled rectifier 150 having its anode 151 connected to the anodes of the devices 124 and 140 and its cathode 152 respectively connected by the capacitors 157 and 156 to the cathodes of the rectifiers 124 and 140. A bias battery 155 will be seen to have its negative terminal connected through a resistor 154 to the cathode 152 and its positive terminal connected to the workpiece 128. The control electrode or gate electrode 153 of the silicon controlled rectifier 150 is connected through a diode 158 to a winding 159 which is in energy exchange relationship with a winding 160 connected to the timing and control device 161 which will be seen to include a bistable circuit having two sections 162A and 162B which are respectively connected to a multivibrator circuit 163. The arrangement is such that when a positive pulse is induced in winding 159 by the winding 160 in section 162A of the bistable circuit to the control electrode 153 of the silicon controlled rectifier 150, the device 150 will be rendered conductive and cause a positive pulse to be applied via the capacitors 156 and 157 to the cathodes of the controlled rectifiers 124 and 140 to render those two controlled rectifiers nonconductive. Once rendered nonconductive the two controlled rectifiers 124 and 140 will remain nonconductive until a positive pulse is applied to their control electrodes from the transformer 111.

In a similar manner it will be seen that silicon controlled rectifiers 170 and 171 are connected in parallel with the controlled rectifier 104 by having their anodes directly connected to the anode of the controlled rectifier 104 and their cathodes respectively connected through the variable resistors 172 and 173 to the cathode circuit of the controlled rectifier 104. The control or gate electrodes of the rectifiers 170 and 171 are respectively connected through the resistors 174 and 175 and diodes 176 and 177 to the cathode of the diode 135 having its anode connected to the winding 132 of transformer 131. The arrangement of the controlled rectifiers 104, 170, and 171 is such that each is responsive to the positive pulse from transformer 131 to be rendered conductive and with each of the three sharing equally in the current provided by the battery 100 to the welding circuit. A second by-pass capacitor 178 will be seen to be connected parallel with the three controlled rectifiers 104, 170 and 171.

Another controlled rectifier 180 will be seen to have its anode 181 connected to the anodes of the controlled rectifiers 104, 170 and 171 while its cathode 182 is connected by the capacitors 183, 184 and 185 to the cathodes of the controlled rectifiers 104, 170 and 171. The control electrode 186 is connected through a diode 187 to a winding 188 seen to be in energy exchange relationship with a winding 189 which is part of the signal output circuit of the timing and control circuit including the section 162B. A second bias source 190 has its negative terminal connected through a resistor 191 to the cathode 182 and its positive terminal connected to the cathode circuits of the controlled rectifiers 104, 170 and 171. A low impedance stabilizing resistor 199 is connected from the cathode circuits of the controlled rectifiers 104, 170 and 171 to the negative terminal of the battery 100 and will also be seen to be connected in circuit relation with the battery 120 through the transformer windings 110 and 130 via the controlled rectifiers 124 and 140.

A pushbutton switch 192 which is normally in an open condition will be seen to be connected in series circuit between the positive terminal 101 of battery 100 and the anodes of the three diodes 136, 176 and 177 which are respectively connected to the control electrodes of the silicon controlled rectifiers 104, 170 and 171. A conventional radio frequency (R.F.) power supply 193 is connected by leads 194 and 195 to the welding rod 108 and workpiece 128 to provide high frequency signals therebetween to sustain the arc during times of current reversal in a manner well known in the art. Blocking capacitors are includes in the R.F. supply to isolate the ac supply from the welding currents. An inert gas supply 196 is connected by suitable piping 197 to an envelope 198 which is adapted to provide a protective layer of gas in the vicinity of the arc established between the welding rod and the workpiece.

As previously set forth, the timing and control devices 161 can be any of a number in the art and thus for purpose of illustration is seen to include the sections 162A and 162B of a bistable or flipflop circuit which is capacitively coupled to a multivibrator circuit 163 which will be seen to include a pair of triodes 200 and 201 in a common envelope and having a pair of timing networks which include the variable resistors 202 and 203 as well as the cross coupling capacitors 204 and 205. As is common in the art, one or the other of the triodes 201 or 200 is conductive for a time determined by its associated timing circuit and as a result thereof one or the other of the sections 162A or 162B of the bistable circuit is made conductive. The time that the circuit remains in one condition or the other is determined by the adjustment of the timing networks primarily through the adjustment of the variable resistors 202 and 203. Upon changing from one condition to the other it will be seen that an appropriate pulse will be provided to one or the other of the silicon controlled rectifiers 150 or 180. As previously described, the timing networks in the multivibrator are preferably adjusted so that current flow is predominantly from the welding rod 108 to the workpiece 128 with short duration cleaning pulses in the reverse direction being provided. It will be obvious to one skilled in the art that other timing and control circuits can readily be adjusted to use in the apparatus of the present invention.

The operation of the circuit illustrated in FIGURE 4 is as follows. The switches 102 and 122 are closed and then the pushbutton 192 is momentarily depressed which causes the positive voltage from battery 100 to be applied to the control electrodes of the silicon controlled rectifiers 104, 170 and 171 through the diodes 136, 176 and 177. This renders the controlled rectifiers 104, 170 and 171 conductive and therefore current flows from the positive terminal 101 of battery 100 through those three controlled rectifiers to the welding rod 108, to the workpiece 128 and through the transformer winding 110 back to the negative electrode 109 of the battery 100. When the section 162B of the bistable circuit 162 is being rendered conductive by a pulse derived from the multivibrator 163 a positive pulse is applied to the control electrode 186 of the controlled rectifier 180 and therefore the capacitors 183, 184 and 185 are provided with current from the battery 100 through the now conducting controlled rectifier 180 and as a result thereof a positive pulse is applied to the cathodes of the three conducting controlled rectifiers 104, 170 and 171. These pulses render the three controlled rectifiers nonconductive and therefore current flow through the transformer winding 110 is terminated. Such termination of current flow through the winding 110 is terminated. Such termination of current flow through the winding 110 induces a positive pulse on the diodes 115 and 145 through the transformer winding 112 and accordingly a positive pulse is applied to the control electrodes of the controlled rectifiers 124 and 140 rendering those two devices conductive. As is well known in the art, presently available silicon controlled rectifiers require only a few microseconds to become fully conductive and therefore substantially immediately upon termination of current flow to the welding rod 108 from the battery 100 the rectifiers 124 and 140 are made conductive and current flows from the positive terminal 121 of battery 120 through the controlled rectifiers 124 and 140 to the workpiece 128, to the welding rod 108, through the transformer winding 130 and back to the negative terminal 129 of the battery 120. After a selected time interval determined in accordance with the setting of the associated timing network in the multivibrator circuit 163 the section 162A of the bistable circuit is rendered conductive and a pulse is generated in the winding 159. The pulse is of the proper polarity to cause the controlled rectifier 150 to be rendered conductive and therefore a positive pulse is applied to the cathodes of the controlled rectifiers 124 and 140. This renders the controlled rectifiers 124 and 140 nonconductive and hence current flow through the winding 130 induces a voltage in the winding 132 which is of the proper polarity to cause a positive pulse to be applied through diode 135 and the diodes 136, 176, and 177 to the control electrodes of the silicon controlled rectifiers 104, 170 and 171 rendering those three devices conductive. The direction of current flow is therefore again reversed with the battery 100 then providing welding current to the welding rod 108.

Since it is normally desirable to have the current flowing from the welding rod 108 to the workpiece 128 continue for a longer time than the duration of current flow in the reverse direction it will be seen that three silicon controlled rectifiers are connected in parallel in the circuit which includes battery 100 while only two silicon controlled rectifiers are connected in parallel in the circuit which includes the battery 120. This reduces the power which is passed through each of the individual controlled rectifiers 104, 170 and 171 but it is of course obvious that different combinations or arrangements of the current gating devices can be arranged in accordance with the requirements of a specific welding application. It is of course also obvious that the timing networks in the multivibrator circuit can be adjusted to be of any desired relative magnitude or can be made equal depending upon the relative duration of current flow desired in each of the two directions between the workpiece and welding rod.

There has thus been disclosed an improved welding apparatus which makes use of the advantages of A.C. and D.C. welding techniques and makes possible uniform and high strength welds. The apparatus is well adapted to fusion welding of many metals. While various specific circuit arrangements can be provided to make use of the teachings of the present invention and various individual components in such circuits will suffice to control the flow of current, silicon controlled rectifiers such as those manufactured by the Westinghouse Corporation and identified as Part No. WX 809D are found to work well in an arrangement such as that illustrated in the schematic circuit diagram of FIGURE 4 in combination with twenty-eight volt heavy duty current sources. Various modifications and specific arrangements which will become obvious to one skilled in the art from the teachings of the invention are intended to be encompassed within the following claims.

What is claimed is:

1. A welding apparatus comprising in combination: a load circuit; direct current supply means; a first current gate having a conductive and a nonconductive condition connected to said supply means and to said load circuit and adapted when in its conductive condition to provide current flow through said circuit in a first direction; a second current gate having a conductive and a nonconductive condition connected to said supply means and to said load circuit and adapted when in its conductive condition to provide current flow through said circuit in a second direction opposite to said first direction; a first feedback circuit coupled with said load circuit and with said second current gate responsive to the termination of current flow in said first direction through said load circuit to render said second current gate conductive; a second feedback circuit coupled with said load circuit and with said first current gate and responsive to termination of current flow through said load circuit in said second direction to render said first current gate conductive; and control means connected to said first and second current gates adapted to alternately apply first and second control signals respectively to said first and said second current gates to alternately render said first and said second current gates nonconductive.

2. A welding apparatus in accordance with claim 1 wherein said control means includes variable timing means controlling the time between a first signal and a second signal and between a second signal and a first signal, whereby current is provided through said load circuit alternately in said first and second directions with the duration of current flow in each of said first and second directions being individually variable.

3. A welding apparatus comprising in combination: a welding load circuit; direct current voltage supply means; first current gating means connected to said load circuit and to said supply means operative in a first condition to provide current from said supply means through said circuit in a first direction and in a second condition to prevent current from flowing from said supply means to said circuit in said first direction; second current gating means connected to said load circuit and to said supply means operative in a first condition to provide current from said supply means through said circuit in a second direction opposite to said first direction and in a second condition to prevent current from flowing from said supply means to said circuit in said second direction; and control means maintaining said first gating means in its said first condition and said second gating means in its said second condition for a first time interval and then rapidly changing said first gating means to its said second condition and said second gating means to its said first condition and maintaining each of said gating means in said changed condition for a second time interval, said control means including signal generating means coupled with each of said gating means and with said load circuit operative to place said second gating means in its said first condition in response to termination of current flow through said load circuit in said first direction and to place said first gating means in its said first condition in response to termination of current flow through said load circuit in said second direction.

4. A welding apparatus in accordance with claim 3 wherein said signal generating means includes first and second variable timing means for controlling said first and second time intervals.

References Cited by the Examiner
UNITED STATES PATENTS 2,951,930  9/1960  McKechnie ........ 315—227
3,068,352  12/1962  Correy ............ 219—137

JOHN W. HUCKERT, *Primary Examiner.*

D. O. KRAFT, *Assistant Examiner.*